United States Patent
Canfield et al.

(10) Patent No.: US 7,900,148 B1
(45) Date of Patent: *Mar. 1, 2011

(54) E-MAIL INTERFACE HAVING AN INFORMATIONAL TOOL TIP

(75) Inventors: James Andrew Canfield, Arlington, VA (US); Kenneth Carbone, Annandale, VA (US); David Fairlie Colburn, Reston, VA (US); Linda Nols Myers, Purcellville, VA (US); Thomas E. Van Lenten, Ashburn, VA (US); Gregory Alan Willis, Arlington, VA (US)

(73) Assignee: AOL Inc., Dulles, VA (US)

( * ) Notice: Subject to any disclaimer, the term of this patent is extended or adjusted under 35 U.S.C. 154(b) by 308 days.

This patent is subject to a terminal disclaimer.

(21) Appl. No.: 12/115,193

(22) Filed: May 5, 2008

Related U.S. Application Data

(63) Continuation of application No. 10/326,548, filed on Dec. 23, 2002, now Pat. No. 7,370,277, which is a continuation-in-part of application No. 10/259,844, filed on Sep. 30, 2002, now Pat. No. 7,421,661.

(60) Provisional application No. 60/376,181, filed on Apr. 30, 2002.

(51) Int. Cl.
*G06F 3/00* (2006.01)
*G06F 3/048* (2006.01)

(52) U.S. Cl. .................... 715/752; 715/711

(58) Field of Classification Search .............. 715/711, 715/752
See application file for complete search history.

(56) References Cited

U.S. PATENT DOCUMENTS

| | | |
|---|---|---|
| 5,283,560 A | 2/1994 | Bartlett |
| 5,287,514 A | 2/1994 | Gram |
| 5,307,086 A | 4/1994 | Griffin et al. |
| 5,416,895 A | 5/1995 | Anderson et al. |
| 5,544,352 A | 8/1996 | Egger |
| 5,546,528 A | 8/1996 | Johnston |
| 5,581,670 A | 12/1996 | Bier et al. |
| 5,588,107 A | 12/1996 | Bowden et al. |

(Continued)

OTHER PUBLICATIONS

U.S. Appl. No. 09/405,904, Eric Bosco et al., Entitled: Computer-Implemented Ticker Display. Sep. 24, 1999.

(Continued)

*Primary Examiner* — William L Bashore
*Assistant Examiner* — David Phantana-angkool
(74) *Attorney, Agent, or Firm* — Finnegan, Henderson, Farabow, Garrett & Dunner, LLP

(57) ABSTRACT

An interface enables perception of information regarding e-mail communications. The interface includes an e-mail application user interface that enables perception of e-mail message information for one or more e-mails received by an e-mail participant and that enables active display of one or more of the received e-mails selected by the e-mail participant. The interface also includes a mechanism that determines a request for e-mail message information for one of the e-mails from within a desired e-mail message that is not actively displayed. The interface further includes an informational tool tip that provides a temporary perceivable indication to the e-mail participant of at least a portion of the requested information for the desired e-mail message while maintaining active display of the one or more selected e-mails.

20 Claims, 11 Drawing Sheets

U.S. PATENT DOCUMENTS

| | | | |
|---|---|---|---|
| 5,617,114 | A | 4/1997 | Bier et al. |
| 5,617,526 | A | 4/1997 | Oran et al. |
| 5,627,960 | A | 5/1997 | Clifford et al. |
| 5,644,737 | A | 7/1997 | Tuniman et al. |
| 5,664,133 | A | 9/1997 | Malamud et al. |
| 5,692,142 | A | 11/1997 | Craycroft et al. |
| 5,712,995 | A | 1/1998 | Cohn |
| 5,721,852 | A | 2/1998 | Porter |
| 5,742,813 | A | 4/1998 | Kavanagh et al. |
| 5,754,176 | A | 5/1998 | Crawford |
| 5,760,768 | A | 6/1998 | Gram |
| 5,798,752 | A | 8/1998 | Buxton et al. |
| 5,801,703 | A | 9/1998 | Bowden et al. |
| 5,832,494 | A | 11/1998 | Egger et al. |
| 5,838,315 | A | 11/1998 | Craycroft et al. |
| 5,877,758 | A | 3/1999 | Seybold |
| 5,877,765 | A | 3/1999 | Dickman et al. |
| 5,884,306 | A | 3/1999 | Bliss et al. |
| 5,929,851 | A | 7/1999 | Donnelly |
| 5,936,625 | A | 8/1999 | Kahl et al. |
| 5,937,417 | A | 8/1999 | Nielsen |
| 5,959,621 | A | 9/1999 | Nawaz et al. |
| 5,974,413 | A | 10/1999 | Beauregard et al. |
| 5,990,905 | A | 11/1999 | Chew et al. |
| 5,995,101 | A * | 11/1999 | Clark et al. ................. 715/711 |
| 6,002,398 | A | 12/1999 | Wilson |
| 6,002,400 | A | 12/1999 | Loring et al. |
| 6,018,571 | A | 1/2000 | Langlois et al. |
| 6,057,844 | A | 5/2000 | Strauss |
| 6,078,935 | A | 6/2000 | Nielsen |
| 6,081,830 | A | 6/2000 | Schindle |
| 6,091,409 | A | 7/2000 | Dickman et al. |
| 6,092,068 | A | 7/2000 | Dinkelacker |
| 6,097,389 | A | 8/2000 | Morris et al. |
| 6,118,427 | A | 9/2000 | Buxton et al. |
| 6,144,375 | A | 11/2000 | Jain et al. |
| 6,147,685 | A | 11/2000 | Bliss et al. |
| 6,173,316 | B1 | 1/2001 | De Boor et al. |
| 6,188,403 | B1 | 2/2001 | Sacerdoti et al. |
| 6,212,548 | B1 | 4/2001 | DeSimone et al. |
| 6,229,539 | B1 | 5/2001 | Morcos et al. |
| 6,233,571 | B1 | 5/2001 | Egger et al. |
| 6,233,726 | B1 | 5/2001 | Bowman et al. |
| 6,237,135 | B1 | 5/2001 | Timbol |
| 6,246,411 | B1 | 6/2001 | Strauss |
| 6,248,946 | B1 | 6/2001 | Dwek |
| 6,252,594 | B1 | 6/2001 | Xia et al. |
| 6,260,148 | B1 | 7/2001 | Aggarwal et al. |
| 6,271,840 | B1 | 8/2001 | Finseth et al. |
| 6,275,790 | B1 | 8/2001 | Yamamoto et al. |
| 6,281,879 | B1 | 8/2001 | Graham |
| 6,301,609 | B1 | 10/2001 | Aravamudan et al. |
| 6,304,879 | B1 | 10/2001 | Sobeski et al. |
| 6,317,128 | B1 | 11/2001 | Harrison et al. |
| 6,346,952 | B1 | 2/2002 | Shtivelman |
| 6,362,842 | B1 | 3/2002 | Tahara et al. |
| 6,369,837 | B1 | 4/2002 | Schirmer |
| 6,377,944 | B1 | 4/2002 | Busey et al. |
| 6,381,735 | B1 | 4/2002 | Hunt |
| 6,384,849 | B1 | 5/2002 | Morcos et al. |
| 6,396,513 | B1 | 5/2002 | Helfman et al. |
| 6,407,757 | B1 | 6/2002 | Ho |
| 6,434,599 | B1 | 8/2002 | Porter |
| 6,519,629 | B2 | 2/2003 | Harvey et al. |
| 6,539,421 | B1 | 3/2003 | Appelman et al. |
| 6,665,395 | B1 | 12/2003 | Busey et al. |
| 6,691,159 | B1 | 2/2004 | Grewal et al. |
| 6,731,308 | B1 | 5/2004 | Tang et al. |
| 6,784,901 | B1 | 8/2004 | Harvey et al. |
| 6,907,447 | B1 | 6/2005 | Cooperman et al. |
| 6,907,580 | B2 * | 6/2005 | Michelman et al. .......... 715/856 |
| 6,963,903 | B2 * | 11/2005 | Krueger et al. ............... 709/206 |
| 6,975,988 | B1 * | 12/2005 | Roth et al. .................... 704/260 |
| 6,981,223 | B2 | 12/2005 | Becker et al. |
| 7,017,119 | B1 | 3/2006 | Johnston et al. |
| 7,218,718 | B2 * | 5/2007 | Grabenstaetter et al. ....................... 379/211.02 |
| 7,370,277 | B1 * | 5/2008 | Canfield et al. .............. 715/752 |
| 7,487,441 | B2 * | 2/2009 | Szeto .......................... 715/234 |
| 2002/0054013 | A1 | 5/2002 | Graham |
| 2002/0073207 | A1 | 6/2002 | Widger et al. |
| 2002/0097277 | A1 | 7/2002 | Pitroda |
| 2002/0101446 | A1 | 8/2002 | Tang et al. |
| 2002/0130904 | A1 | 9/2002 | Becker et al. |
| 2002/0160819 | A1 | 10/2002 | Daurensan |
| 2002/0163545 | A1 | 11/2002 | Hii |
| 2003/0030670 | A1 | 2/2003 | Duarte et al. |
| 2003/0052915 | A1 | 3/2003 | Brown et al. |
| 2003/0142141 | A1 | 7/2003 | Brown et al. |
| 2003/0146939 | A1 * | 8/2003 | Petropoulos et al. ......... 345/810 |
| 2003/0164862 | A1 | 9/2003 | Cadiz et al. |
| 2003/0210265 | A1 | 11/2003 | Haimberg |
| 2009/0094512 | A1 * | 4/2009 | Szeto .......................... 715/234 |
| 2009/0241071 | A1 * | 9/2009 | Seacat et al. ................. 715/856 |

OTHER PUBLICATIONS

Amanda Matthiesen, "Hotmail Help: A Brief Introduction to the Free E-mail Service," May 2000, Internet: http://www.town.brookline.ma.us/library/computer/hotmail.htm.

Tricon Softward, "Tricon Software & Development," Apr. 20, 2001, Internet: http://www.triconsoft.com.

"Design Requirements Document (DRD)," Instant AOL, Instant AOL Refresh v1.1, Document Version 8.0, Oct. 23, 2001, 8 pages.

"Design Requirements Document (DRD)," Gamera, Revision 18, Apr. 10, 2001, 110 pages.

"AOL IM Companion," Tricon Software & Development, published Mar. 7, 2001. 7 total pages retrieved Jul. 16, 2003 from World Wide Web: http://download.com.com/3000-2150-5056089.html?legacy=cnet (1 page); http://www.triconsoft.com/screenshots/mnuIMAnswer.jpg (1 page); http://www.triconsoft.com/screenshots/mnuOptions.jpg (1 page); http://www.triconsoft.com/screenshots/IMCompanionTabs.jpg (1 page) http://www.triconsoft.com/screenshots/IMCompanionListBox.jpg (1 page) http://www.triconsoft.com/IMCompanion.asp (2 pages).

"Move or Cover Sheets," Microsoft Excel 2000 Help File. 8 total pages retrieved Jul. 21, 2003 from World Wide Web: http://www.triconsoft.comIMCompanionShots.asp (4 pages); mk:@MSITStore:C:\Program%20Files\Microsoft%20Office\Office\1033\xlmain9.chm::htm...(1 page); About Microsoft Excel (3 pages).

"A.I.M. Frames," BPS Software, lastest version Jul. 3, 2003, first published version Jun. 1, 1998. 7 total pages retrieved Jul. 11, 2003 from World Wide Web. http://www.bpssoft.com/AIMFrame/Index.htm (3 pages); http://www.bpssoft.com/AIMFrame/history.htm (4 pages).

"Power Tools Pro," BPS Software, first published release May 10, 2000. 24 pages retrieved Jul. 16, 2003 from World Wide Web: http://www.bpssoft.com/PowerTools/history.htm (19 pages); http://www.bpssoft.com/PowerTools/images/shots/9pwrim.gif (1 page); http://www.bpssoft.com/PowerTools/ptshots.htm (4 pages).

International Search Report (6 pages), Sep. 2003.

Anonymous "GameSpy Arcade—Play Hundreds of Online Multiplayer Games," Internet Document, [Online], pp. 1-3, retrieved from the internet, http://www.gamespyarcade.com/support/help/communicate.shtml [retrieved on Apr. 12, 2004].

* cited by examiner

FIG. 4B

MAIL: SURFIN JERRY'S MAILBOX  _ □ X

MAILBOX

REMINDER: AOL STAFF WILL NEVER ASK FOR YOUR PASSWORD OR BILLING INFORMATION.

THE $40,000 SAVE FOR COLLEGE SWEEPSTAKES   HELP

400B

ON AOL
- NEW MAIL
- OLD MAIL
- SENT MAIL
- DELETED MAIL

425

NEW MAIL    LOREM IPSUM DOLOR SIT AMET, CONSECTETUER ADIPISCING ELITR

| TYPE | DATE ▽ | EMAIL ADDRESS | SUBJECT |
|---|---|---|---|
| ✉ | 3/22/02 | CHATTINGCHUCK | EMERIL, ALTON BROWN, ALICE WATERS, AND |
| ✉ | 3/25/02 | GABBYGRACE | HOW ABOUT FRI LUNCH? |
| ✉ | 3/25/02 | SURFINDIANE | CHINA TOOL BAR |
| ✉ | 3/25/02 | GABBYGRACE | TEMP |
| ✉ | 3/25/02 | CHATTINGCHUCK | REVIEW FOR 3.26 |

410a, 410b, 410c, 410d, 410e

FROM: CHATTINGCHUCK          DATE: MARCH 22, 2002
TO:   SURFINJERRY

417

FROM: GABBYGRACE SUBJ: HOW ABOUT FRI LUNCH?

ARE YOU UP FOR SUSHI THIS TIME?

430

READ | SAVE TO FOLDER ▽ | KEEP AS NEW | STATUS | NOTIFY AOL | DELETE

☐ SET UP MY FOLDERS
☐ MAIL CONTROLS

E-MAIL INTERFACE HAVING AN INFORMATIONAL TOOL TIP

This application is a continuation of U.S. patent application Ser. No. 10/326,548, filed Dec. 23, 2002, which is a continuation-in-part of U.S. application Ser. No. 10/259,844, filed Sep. 30, 2002, and which claims priority from U.S. Provisional Application No. 60/376,181, filed Apr. 30, 2002, all of which are incorporated by reference in their entireties.

TECHNICAL FIELD

The following description relates generally to providing a user interface and more particularly to providing an informational tool tip for an e-mail user interface.

BACKGROUND

Online service providers facilitate access to information and services by providing interactive UIs (User Interfaces) that help users navigate to desired resources. Generally, a UI allows a user to execute particular commands or to link to certain locations by simply selecting screen objects such as icons, windows, and drop-down menus. The design of a UI has a significant impact on a user's online experience. In particular, the icons, the windows, and the menus of a UI may be arranged to enable a user to locate preferred information and services quickly and easily.

SUMMARY

In one general aspect, an interface enables perception of information regarding e-mail communications. The interface includes an e-mail application user interface that enables perception of e-mail message information for one or more e-mails received by an e-mail participant and that enables active display of one or more of the received e-mails selected by the e-mail participant. The interface also includes a mechanism that determines a request for e-mail message information for one of the e-mails from within a desired e-mail message that is not actively displayed. The interface further includes an informational tool tip that provides a temporary perceivable indication to the e-mail participant of at least a portion of the requested information for the desired e-mail message while maintaining active display of the selected e-mails.

Implementations may include one or more of the following features. For example, the tool tip may be activated in response to participant selection of the desired e-mail message. In one implementation, the participant selection is inferred based upon a position of an input device relative to a user interface. For instance, the selection may be inferred based upon maintaining the input device in a position relative to the user interface for a predetermined threshold period of time. In another implementation, the user selection may be an overt selection activity. For instance, the overt selection may be carried out by manipulating a user input device.

In one implementation, the informational tool tip may be rendered in a pop up window, and may be rendered as an overlay. The tool tip may provide a perceivable indication of less than all of the determined content of the desired e-mail message session. The tool tip is closed automatically based on a timeout or an inferred intent to close the tool tip, rather than based on an express or overt closing instruction by the user. For example, intent to close the tool tip may be inferred based upon the position of a user input device, the movement of a user input device, or a combination of the position of a user input device and the expiration of a predetermined length of time.

In one implementation, the user interface is a visual interface. For example, the desired e-mail message may include a text message and the temporary perceivable indication may include at least a portion of the text message. The desired e-mail message may also include an audio-video message (e.g., a video message) and the temporary perceivable indication may include at least a portion of the audio-video message. In another implementation, the user interface may be an audible interface. For example, the desired e-mail message may include an audio message and the temporary perceivable indication may include at least a portion of the audio message.

In another general aspect, e-mail information for at least one received e-mail is shown on a visual user interface. The user interface receives a request for e-mail information other than the e-mail information shown by the visual user interface, and a pop-up window is rendered with e-mail information other than the information displayed on the visual user interface while the display of information in the visual user interface is maintained.

Aspects of the informational tool tip may be implemented by an apparatus and/or by a computer program stored on a computer readable medium. The computer readable medium may comprise a disc, a client device, a host device, and/or a propagated signal. In addition, aspects of the informational tool tip may be implemented in a client/host context or in a standalone or offline client device. The informational tool tip may be rendered in a client/host context and may be accessed or updated through a remote device in a client/host environment. The informational tool tip also may be rendered by the standalone/offline device and may be accessed or updated through a remote device in a non-client/host environment such as, for example, a LAN server serving an end user or a mainframe serving a terminal device.

Other features will be apparent from the following description, including the drawings, and from the claims.

DESCRIPTION OF DRAWINGS

FIGS. 4A, 4B, 5A, 5B, 6A, 6B, and 6C are illustrations of different graphical user interfaces that may be implemented by the systems of FIGS. 1 and 2 when executing the processes of FIGS. 3 and 7.

Like reference symbols in the various drawings indicate like elements. For brevity, several elements in the figures described below are represented as monolithic entities. However, as would be understood by one skilled in the art, these elements each may include numerous interconnected computers and components designed to perform a set of specified operations and/or may be dedicated to a particular geographical region.

DETAILED DESCRIPTION

In general, an informational tool tip may be provided for an e-mail user interface (UI). An informational tool tip for the e-mail UI is capable of presenting to the user a perceivable indication of at least a portion of an e-mail message that is not being actively displayed. As such, the informational tool tip is able to accommodate a user who seeks to perceive information about one of the e-mail messages that is not actively displayed to the user, while maintaining active display of the currently displayed e-mail message. Although such functionality may be applied to other communications environments, it may have particular utility when applied to an e-mail environment, where it may be used to quickly view content from within a received message without requiring the user to open a persistent window dedicated to that message, and without requiring the user to otherwise change a current view.

In order to activate the informational tool tip, the user may select a desired e-mail message that is not being actively displayed. For example, to activate and render the informational tool tip, the user may position a mouse or other viewer input device proximate to or over an interface tab or icon corresponding to the desired e-mail message. In response, the informational tool tip may be rendered as a pop-up window and may be rendered in any location on the display.

The informational tool tip may be used to present all or a portion of the desired e-mail message other than the selected or default message displayed in the preview pane 417 or other e-mail message UI, and to do so without affecting the display of the default or selected e-mail message. In one implementation, a predetermined number of lines or characters of content from within the desired e-mail message are presented. In another implementation, one or more predetermined fields of the message are presented. In another implementation, the content presented in the tool tip is variable and may depend, for example, upon the manner or context in which the tool tip was invoked. The contents of the desired e-mail message may be made available to the tool tip by, for example, a client system or a host system, or a combination thereof.

Figure 1:
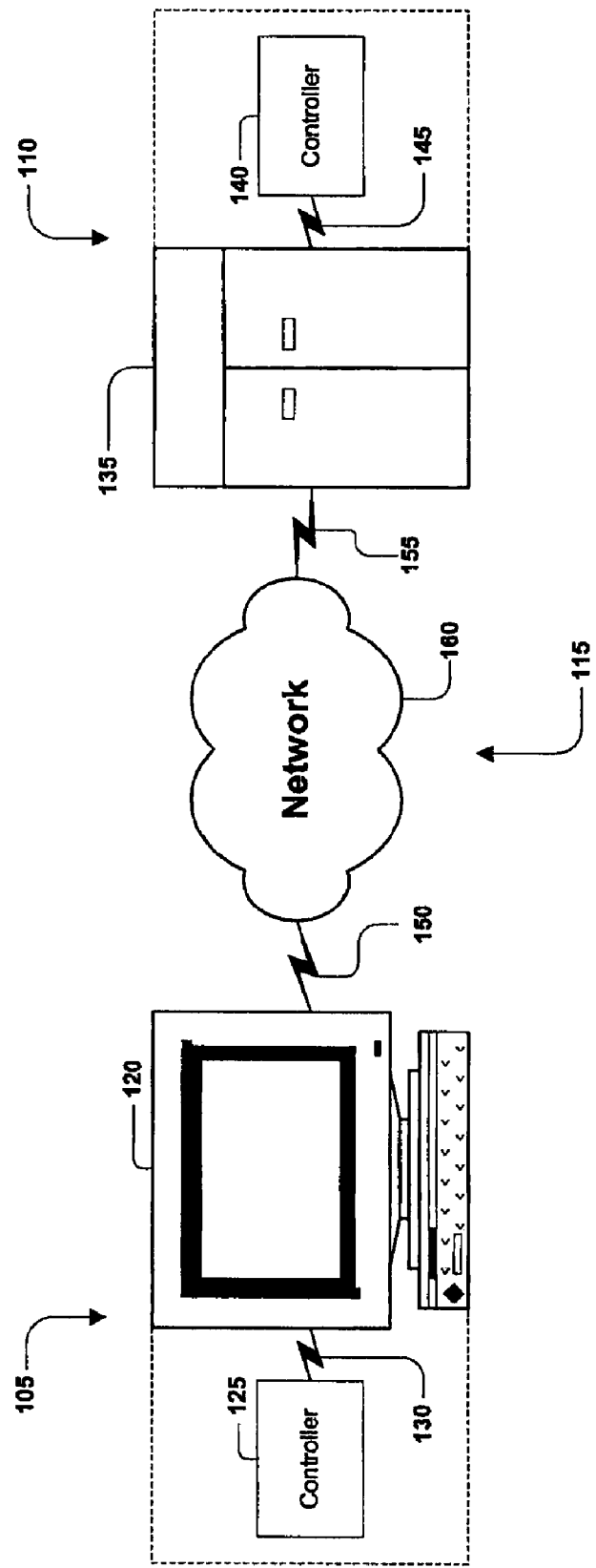
FIGS. 1 and 2 are block diagrams of a communications system.
Figure 2:
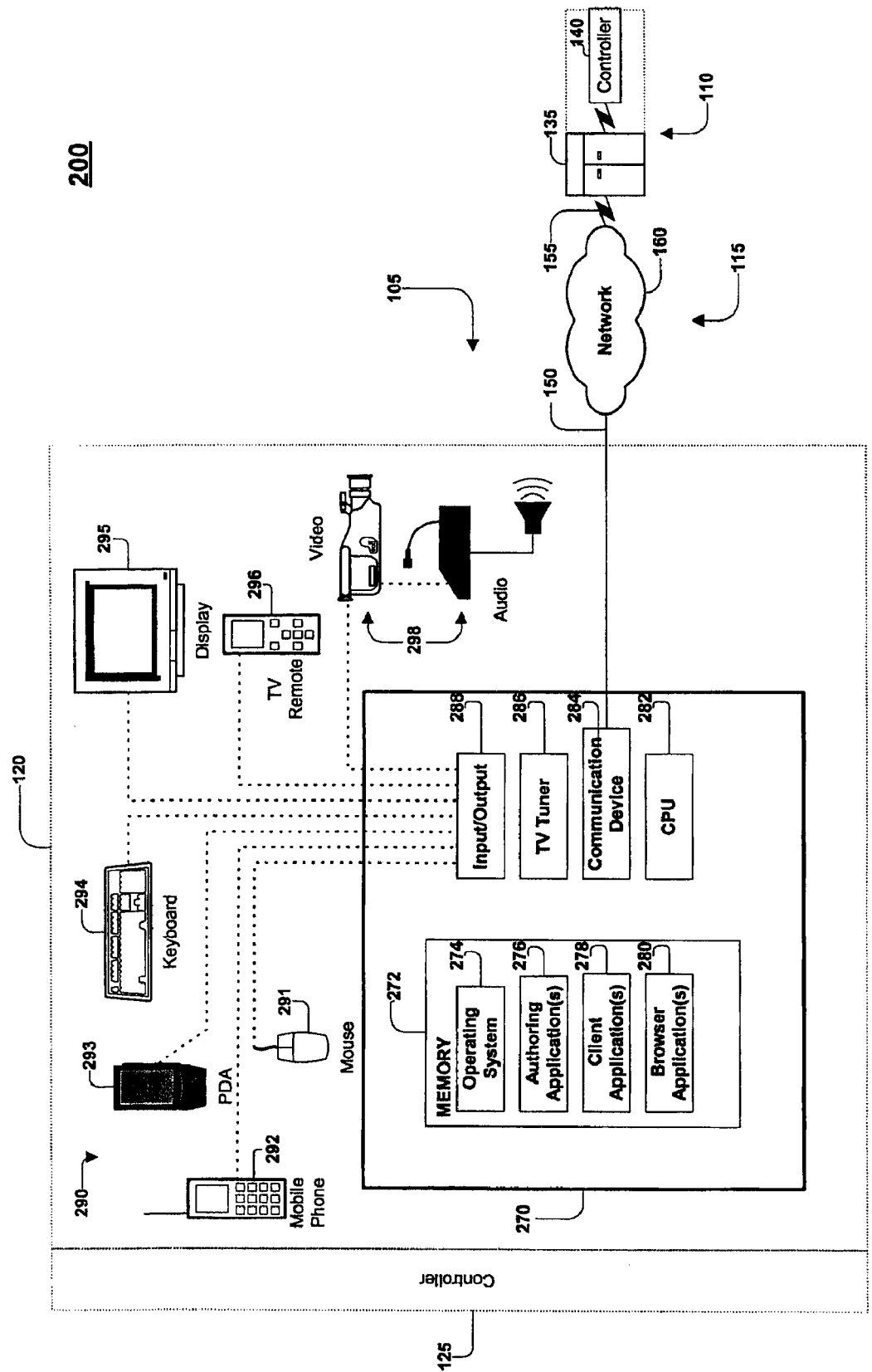

For illustrative purposes, FIGS. 1 and 2 show an example of a communications system for implementing techniques for transferring electronic data such as e-mail messages.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 and the host device 135 are generally capable of executing instructions under the command of, respectively, a client controller 125 and a host controller 140. The client device 120 and the host device 135 are connected to, respectively, the client controller 125 and the host controller 140 by, respectively, wired or wireless data pathways 130 and 145, which are capable of delivering data.

The client device 120, the client controller 125, the host device 135, and the host controller 140 typically each include one or more hardware components and/or software components. An example of a client device 120 or a host device 135 is a general-purpose computer (e.g., a personal computer) or software on such a computer capable of responding to and executing instructions in a defined manner. Other examples include a special-purpose computer, a workstation, a server, a device, a component, other physical or virtual equipment, or some combination of these capable of responding to and executing instructions. The client device 120 and the host device 135 may include devices that are capable of establishing peer-to-peer communications.

An example of client controller 125 or host controller 140 is a software application loaded on the client device 120 or the host device 135 for commanding and directing communications enabled by the client device 120 or the host device 135. Other examples include a program, a piece of code, an instruction, a device, a computer, a computer system, or a combination of these for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 and the host device 135.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. Public Switched Telephone Network (PSTN), Integrated Services Digital Network (ISDN), and Digital Subscriber Line (xDSL)), radio, television, cable, or satellite systems, and other delivery mechanisms for carrying data. The communications link 115 may include communication pathways 150 and 155 that enable communications through the one or more delivery networks 160 described above. Each of the communication pathways 150 and 155 may include, for example, a wired, wireless, cable or satellite communication pathway.

FIG. 2 illustrates a communications system 200 including a client system 105 communicating with a host system 110 through a communications link 115.

The client device 120 typically includes a general-purpose computer 270 having an internal or external memory 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., America Online (AOL) client, CompuServe client, AOL Instant Messenger (AIM) client, interactive television (ITV) client, Internet Service Provider (ISP) client, or instant messaging (IM) client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content and other content formatted according to standard protocols such as the Hypertext Transfer Protocol (HTTP).

One or more of the application programs may be installed in the internal or external memory 272 of the general-purpose computer 270. Alternatively, in another implementation, the client controller 125 may access application programs externally stored in and/or performed by one or more device(s) external to the general-purpose computer 270.

The general-purpose computer 270 also includes a central processing unit 282 (CPU) for executing instructions in response to commands from the client controller 125. The general-purpose computer 270 may include a communication device 284 for sending and receiving data. One example of the communication device 284 is a modem. Other examples include a transceiver, a set-top box, a communication card, a satellite dish, an antenna, a network adapter, or some other mechanism capable of transmitting and receiving data over the communications link 115 through a wired or wireless data pathway 150. The general-purpose computer 270 also may include a television ("TV") tuner 286 for receiving television programming in the form of broadcast, satellite, and/or cable TV signals. As a result, the client device 120 can selectively and/or simultaneously display network content received by communications device 284 and TV programming content received by the TV tuner 286.

The general-purpose computer 270 may include an input/output interface 288 that enables wired or wireless connection to various peripheral devices 290. Examples of peripheral devices 290 include, but are not limited to, a mouse 291, a mobile phone 292, a personal digital assistant 293 (PDA), an MP3 player (not shown), a keyboard 294, a display monitor 295 with or without a touch screen input, a TV remote control 296 for receiving information from and rendering information to users, and an audiovisual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 120. For example, the mobile phone 292 or the PDA 293 may include computing and networking capabilities and function as a client device 120 by accessing the delivery network 160 and communicating with the host system 110. Furthermore, the client system 105 may include one, some or all of the components and devices described above.

Figure 3:
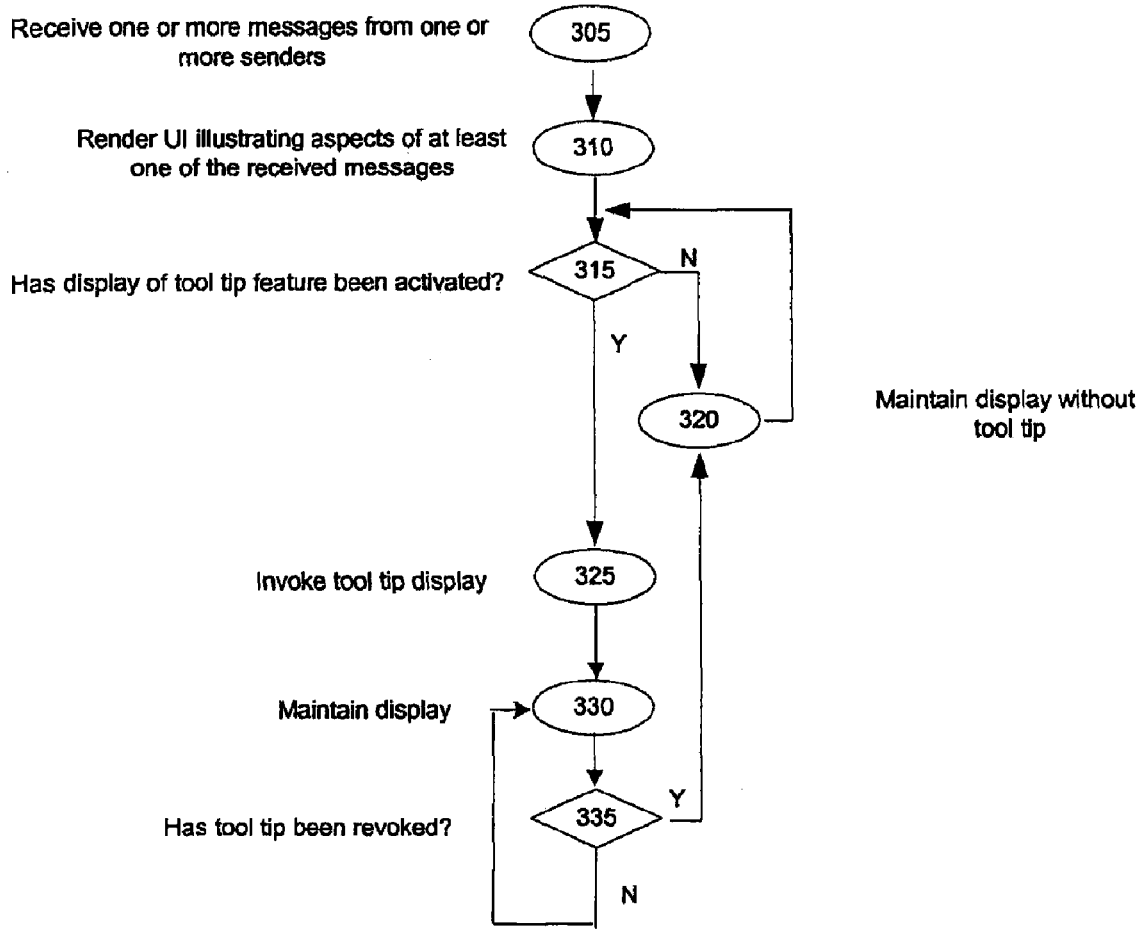
FIGS. 3 and 7 are flow charts of processes that may be implemented by the systems of FIGS. 1 and 2.

Referring to FIG. 3, an exemplary procedure 300 generally involves rendering an informational tool tip for an e-mail UI. The procedure 300 may be implemented by any type of hardware, software, device, computer, computer system, equipment, component, program, application, code, storage medium, or propagated signal.

In procedure 300, the client system 105 receives one or more e-mail messages from one or more e-mail senders (step 305). For instance, client system 105 may connect to the host system 110 across a network (e.g., network 160) by supplying a user identification and password to a server (e.g., a login server) in order to obtain access to the host system 110. The host system 110 may deliver an e-mail message from an e-mail sender across a network 160, and the e-mail message may include, for example, a text message portion, a time of delivery, and a screen name or other identifier for its source.

Next, the client system 105 renders a user interface (UI) illustrating aspects of at least one of the received messages, examples of which are described below with respect to FIGS. 4A, 4B, 5A, 5B, 6A, 6B, and 6C (step 310). In one implementation, the client system 105 renders the UI when an e-mail message from an e-mail sender is provided, and may render other portions of the UI separately at different times. In another implementation, the entire UI, including the e-mail message, may be rendered when the e-mail message is provided. In another implementation, the UI is rendered in response to a user action. For example, the UI may be rendered in response to user selection of an e-mail message. As shown, the UI may provide a preview of a default or selected message, or it may merely show the subjects of the e-mail messages. The UI may be presented using a Web page having text, images, audio, video, and/or other type of content.

While maintaining the default or the selected message, the user may desire to perceive information about a received e-mail message other than the selected or default message, and may do so by activating an informational tool tip (step 315). For example, as discussed below with respect to FIGS. 4B, 5B, 6B, and 6C, the user may invoke an informational tool tip by positioning a mouse 425 or other user input device proximate to or directly over an interface item corresponding to the desired e-mail message. In one implementation, the informational tool tip 430 is activated as soon as the mouse 425 or other user input device is positioned proximate to or directly over the interface tab. In another implementation, the informational tool tip 430 is activated and rendered after the mouse 425 or other user input device remains proximate to or positioned over the interface tab for a predetermined threshold period of time, or after some overt selection activity using the mouse or input device. In yet another implementation, the tool tip may be activated by positioning a mouse or other input device over or proximate to other features of the UI. For example, as shown in FIG. 6B, a user may position the mouse over a new mail status indicator 615 to invoke a tool tip that displays at least a portion of a new message. Also, as shown in FIG. 6C, a user may position the mouse over an icon representing the desired e-mail message 620 to enable activation of the tool tip.

However, if the user is not configured to invoke the informational tool tip or the tool tip feature is not enabled, the current UI display is maintained (step 320).

If the user is able to invoke the informational tool tip, then the tool tip is invoked (step 325). Invoking the tool tip may include rendering the tool tip for a selected e-mail message. As discussed with respect to FIGS. 4B, 5B, 6B, and 6C, the informational tool tip 430 may display all or a portion of the desired e-mail message. In one implementation, a pre-determined or limited number of lines or characters of the desired e-mail message are displayed. In another implementation, a pre-determined number of e-mail fields are displayed. For instance, as shown with respect to tool tip 430 of FIG. 4B, the tool tip may be limited to include two fields of the e-mail message (e.g., the "from" field 415c and the "subject" field 415d) in their entirety and a portion a third field (e.g., the message text). As shown in FIGS. 5B, 6B, and 6C, the tool tip 430 may be limited to include only two fields of the e-mail message (e.g., the "from" field 415c and the "subject" field 415d). The fields of the desired e-mail message may be made available to the tool tip by, for example, the client system 105 or the host system 110, or a combination thereof. The informational tool tip may be rendered in various locations on the display, or it may be non-visual.

Display of the informational tool tip may be maintained until revoked (step 330). Display of the tool tip may be revoked upon expiration of a predetermined period of time, or if the user takes some action to implicitly command removal of the tool tip, e.g., moving the cursor away from a position used to trigger the tool tip (step 335). For example, the informational tool tip 430 may be automatically closed or deactivated if the user moves the mouse or input device 425, or if the mouse or input device 425 is moved from a position over or proximate to the desired e-mail message.

If the user has revoked the informational tool tip and/or the user is no longer enabled to invoke the informational tool tip, then the display described with respect to step 320 is maintained. If the tool tip has not been revoked, then the display described with respect to step 330 is maintained.

While some functions of procedure 300 may be performed entirely by the client system 105, as described, other functions may be performed by the collective operation of the client system 105 and the host system 110. For example, the informational tool tip may be rendered entirely by the client. However, the informational tool tip may be rendered based upon the host system acting in cooperation with the client.

In one of various possible implementations, a client system 105 and a host system 110 may interact according to procedure 300 to provide an e-mail tool tip for an e-mail UI. Although not shown in FIG. 3, the client system 105 and the host system 110 may be directly or indirectly interconnected through known or described delivery networks, examples of which are described with respect to network 160 of FIG. 1. In such an environment, the e-mail UI may be accessed or updated through a remote device. In another implementation, the procedure 300 may be implemented in a standalone or offline client context. The e-mail UI may be rendered by the standalone/offline device and may be accessed or updated through a remote device in a non-client/host environment such as, for example, a LAN server serving an end user or a mainframe serving a terminal device. Thus, procedure 300 may be implemented for any e-mail UI of any OSP, ISP, or browser.

Figure 4A:
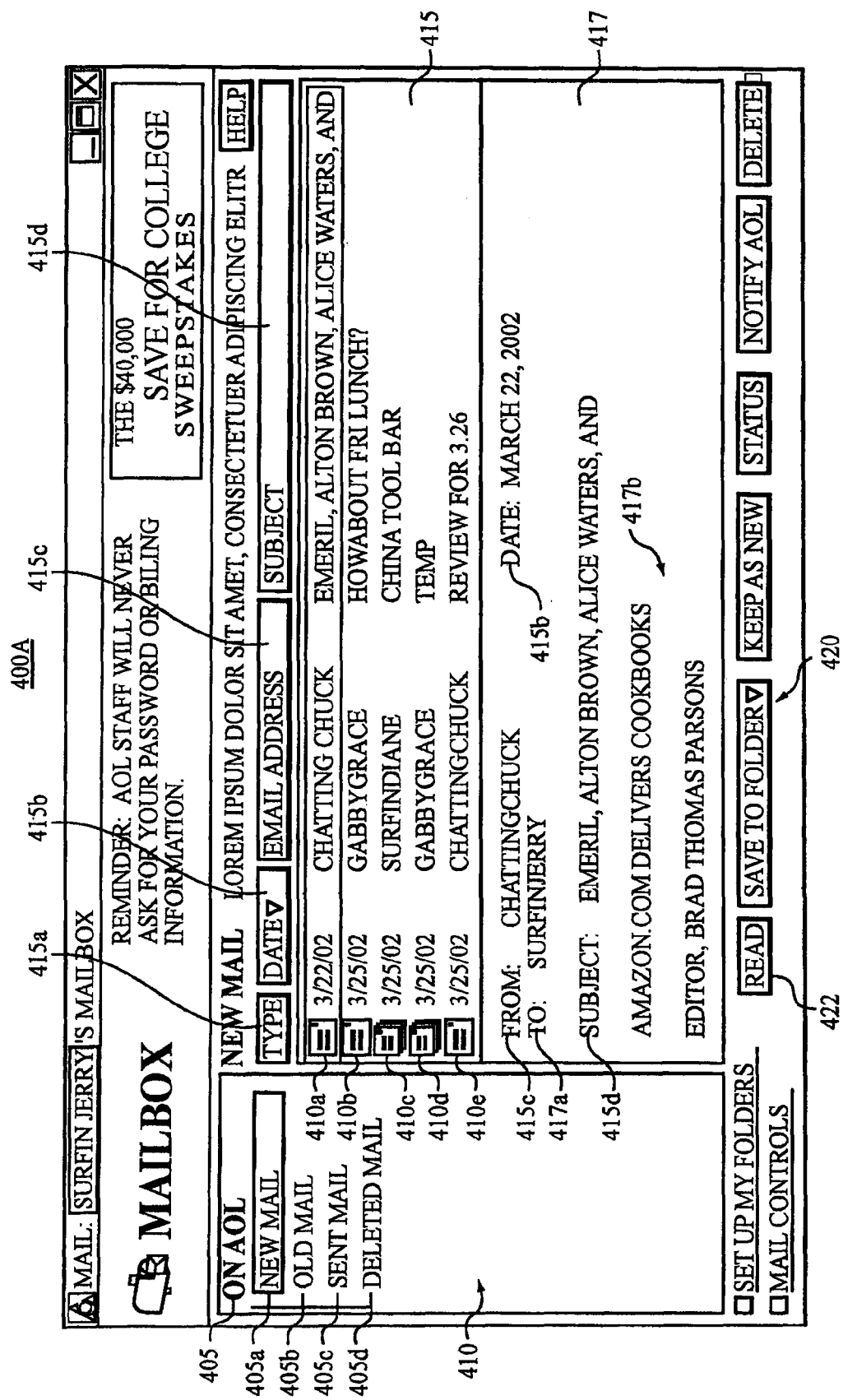
Figure 6A:
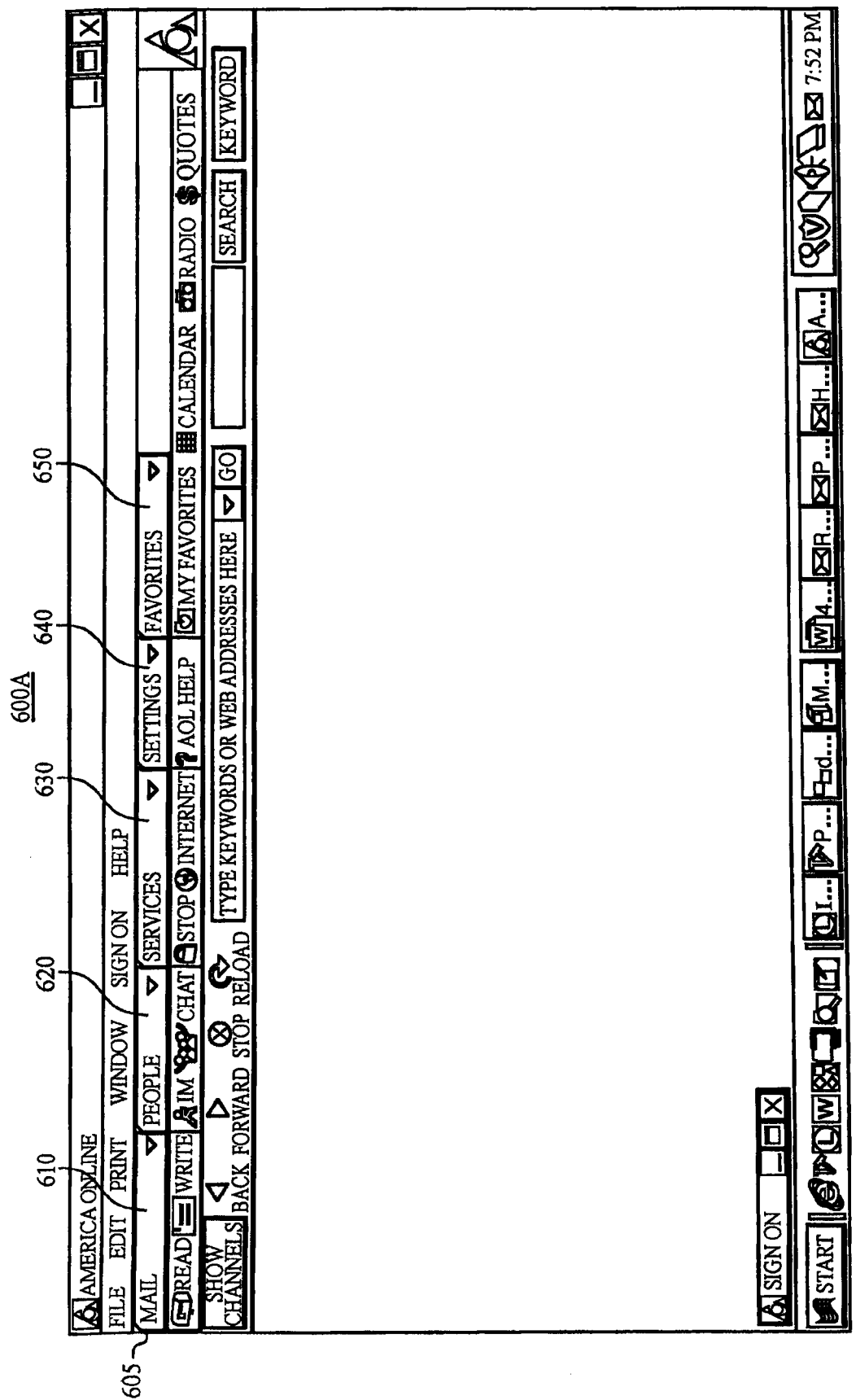
Figure 6B:
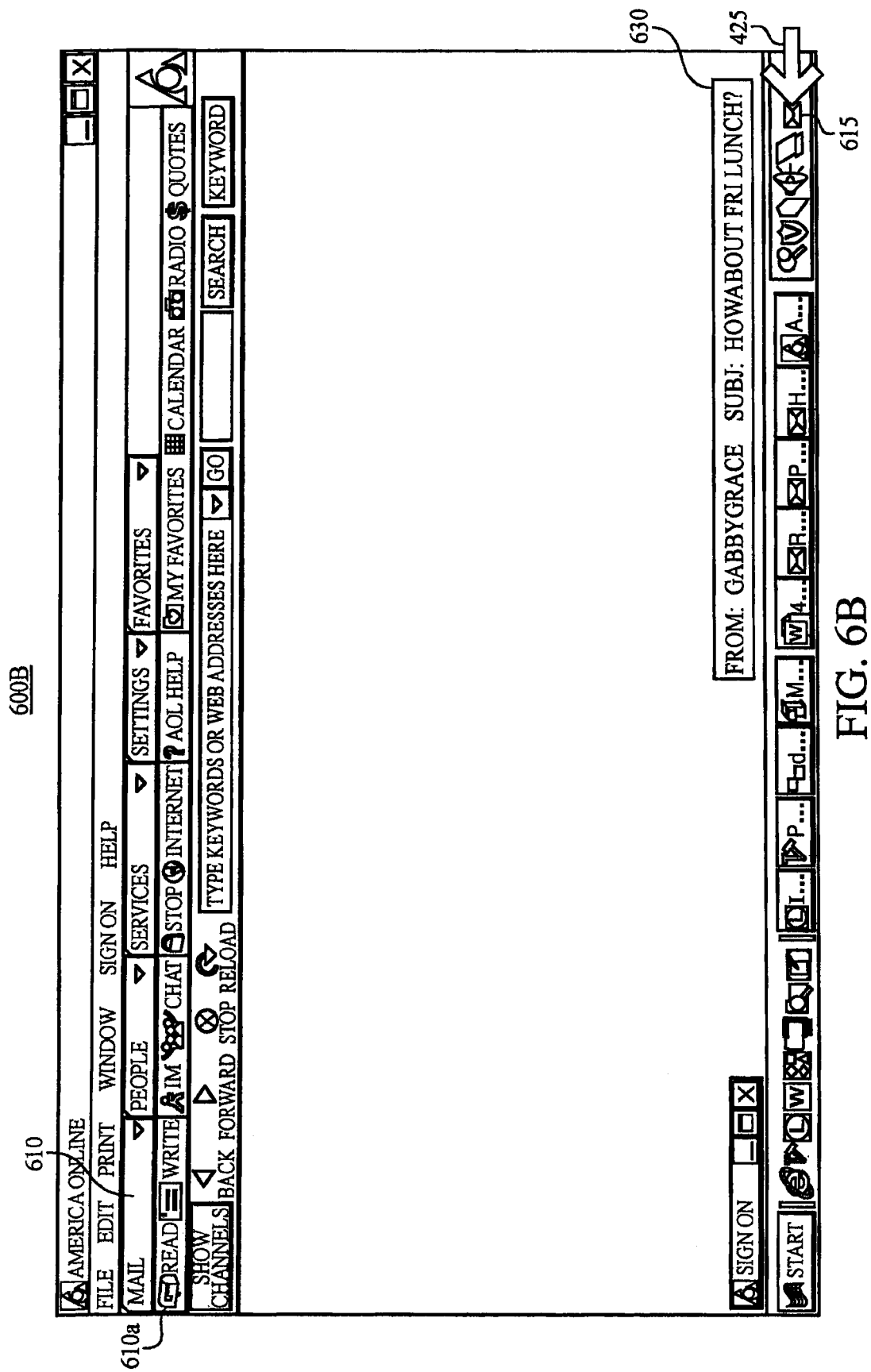
Figure 6C:
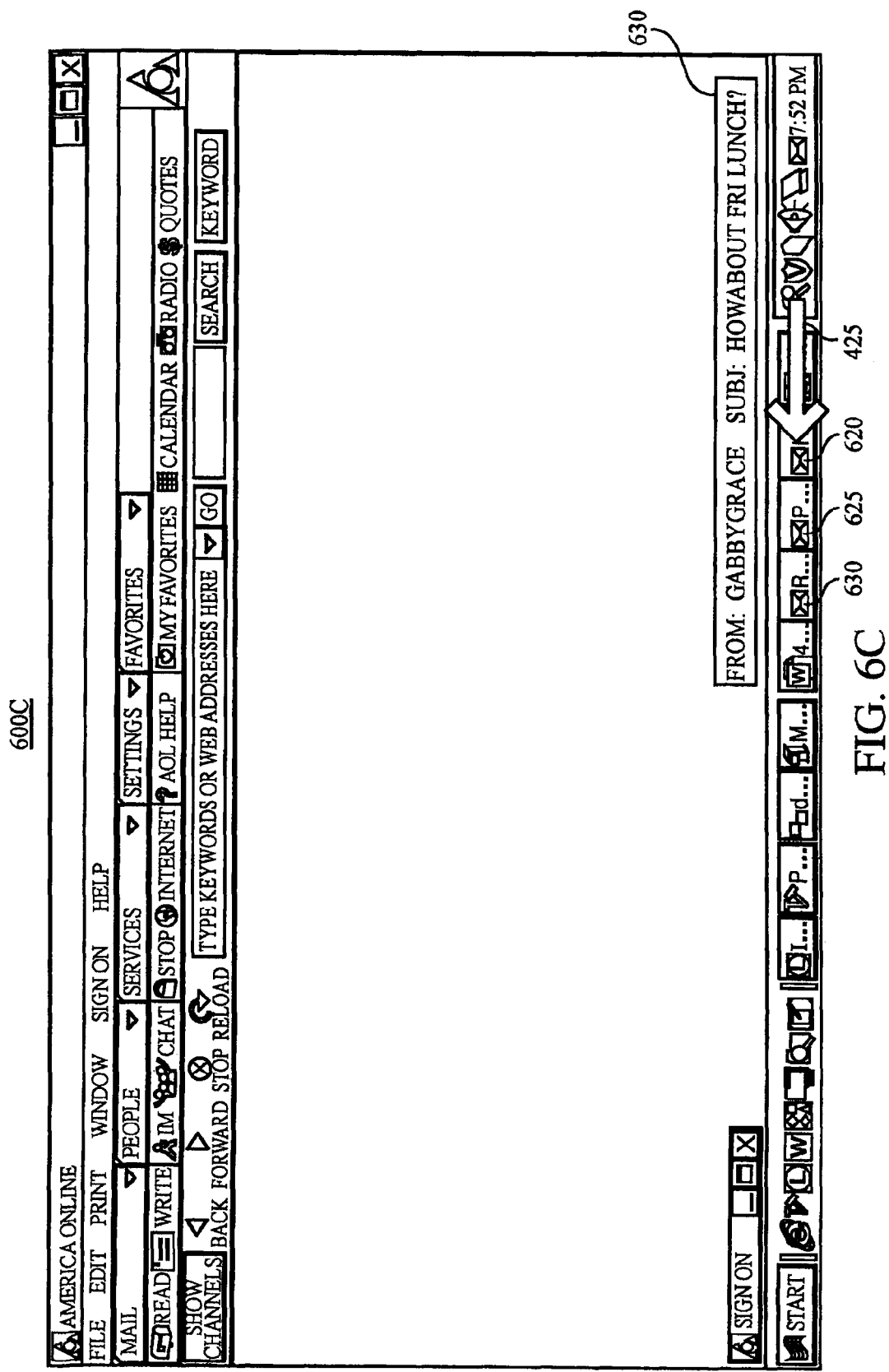

FIG. 4A illustrates one example of an e-mail user interface (UI) 400A that may be presented to a user in response to user manipulation of a general interface actionable item, such as item 610 discussed with respect to FIGS. 6A and 6B. Although UI 400A may be generated remotely and delivered to a user client system 105, in general, the UI 400A will be rendered on or at the client system 105 using software stored on the client system 105. The UI 400A includes a folder list 405 that lists the various folders in which e-mail may be placed. For example, new mail folder 405a may contain new e-mail messages, old mail folder 405b may contain old e-mail messages, sent mail folder 405c may contain mail sent by the user, and deleted mail folder 405d may contain e-mail messages deleted by the user.

UI 400A also includes a display area 415 that displays e-mail messages within a designated folder 405a contained in folder list 405. For example, as shown in FIG. 4A, display area 415 contains a list of messages 410 contained in designated new mail folder 405a. The messages 410 include messages 410a, 410b, 410c, 410d, and 410e. Each message 410 contains one or more fields. For example, the messages 410 shown in display area 415 each contain a type field 415a, a date field 415b, a from field 415c, and a subject field 415d. A set of controls 420 is provided for the user to manipulate each of the e-mail messages 410. Controls 420 include a control 422 that enables the user to read one of the e-mail messages 410. Once control 422 is acted on by a user, the corresponding e-mail message is read and a separate UI is rendered in order for the user to read the designated e-mail message.

A preview pane 417 is provided to allow a user to preview a default or a selected message. In the example of FIG. 4A, the preview pane 417 shows information about a selected or default message 410a, including the "From" field 415c, the "To" field 417a, the "Date" field 415b, the "Subject" field 415d, and a portion of the message text 417b. The preview pane display remains visible unless manually deactivated by user manipulation of UI display control options.

FIG. 4B illustrates another example of an e-mail UI 400B that is similar to the example discussed above with respect to FIG. 4A. In the example of FIG. 4B, an informational tool tip 430 is invoked on the e-mail UI to provide the user with a perceivable indication of least of a portion of an e-mail message that is not otherwise being actively displayed. For example, the informational tool tip 430 may show all or a portion of the desired e-mail message 410b.

In the example of FIGS. 4A and 4B, the standard interface being displayed includes a subject line for the non-selected e-mail messages 410b, 410c, 410d, 410e, but it does not display the body of these non-selected e-mail messages. Yet, in the example of FIG. 4B, in response to a user action with respect to e-mail message 410b (e.g., movement of a cursor 425 over e-mail 410b), the tool tip 430 is invoked to enable perception of at least a portion of the body of e-mail message 410b. More specifically, to activate and render the informational tool tip 430, the user may position a pointer 425 of a mouse or other user input device proximate to or over a field corresponding to e-mail message 410b.

As shown in FIG. 4B, the pointer 425 is positioned over the type field 415a for e-mail message 410b. In another implementation, the informational tool tip 430 is activated and rendered after the pointer 425 remains proximate to or positioned over a field of the desired e-mail message 410b for a predetermined threshold period of time, or after some overt activities taken using the mouse or input device with respect to e-mail 410b.

The user may close or deactivate the informational tool tip 430. In one implementation, the informational tool tip 430 may be automatically closed or deactivated if the user moves the pointer 425. For example, if the pointer 425 is moved from a position over or proximate to the desired e-mail message 410b. As shown in the implementation of FIG. 4B, the informational tool tip shows all or a portion of the body of the desired e-mail message 410b.

Figure 5A:
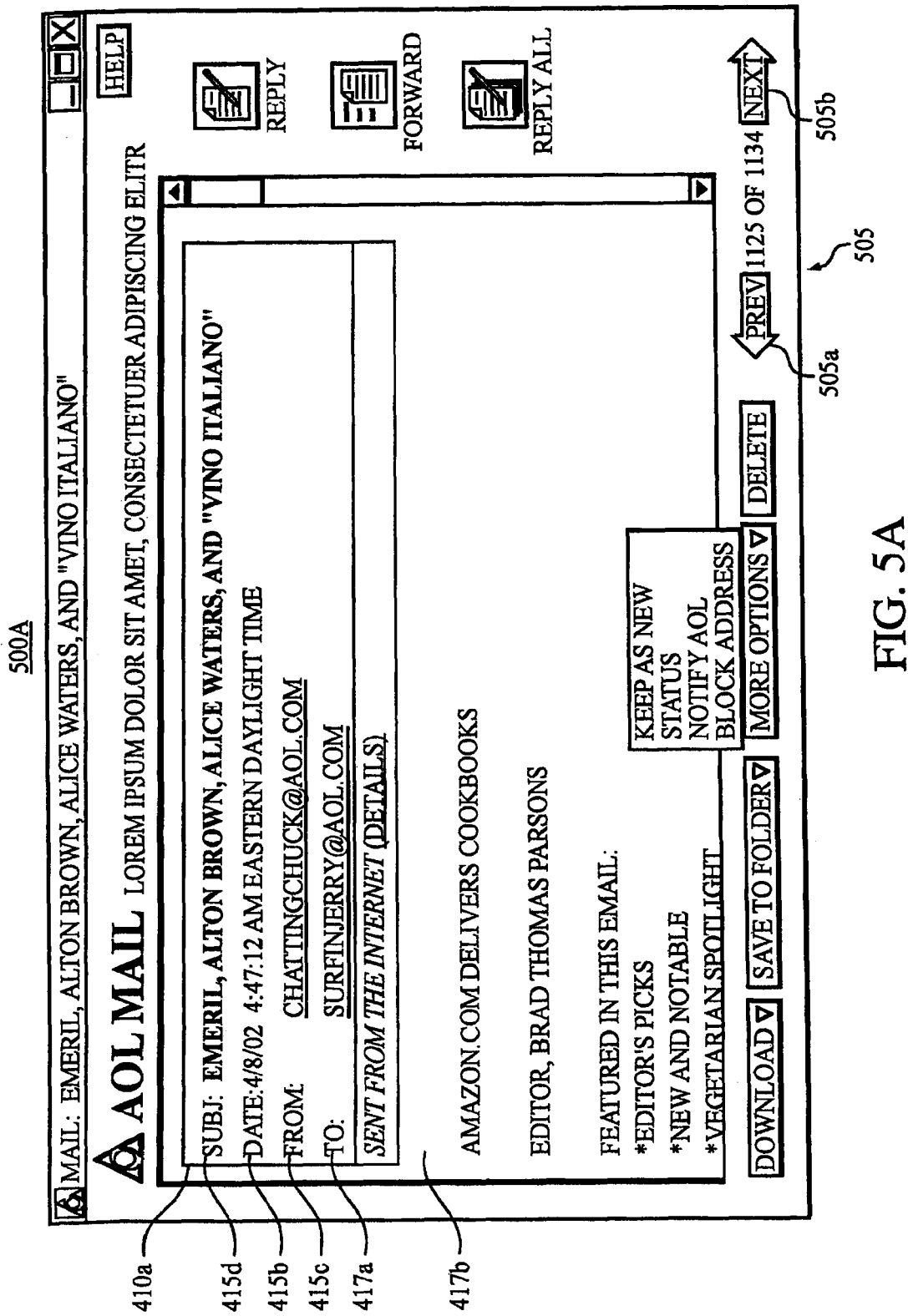
Figure 5B:
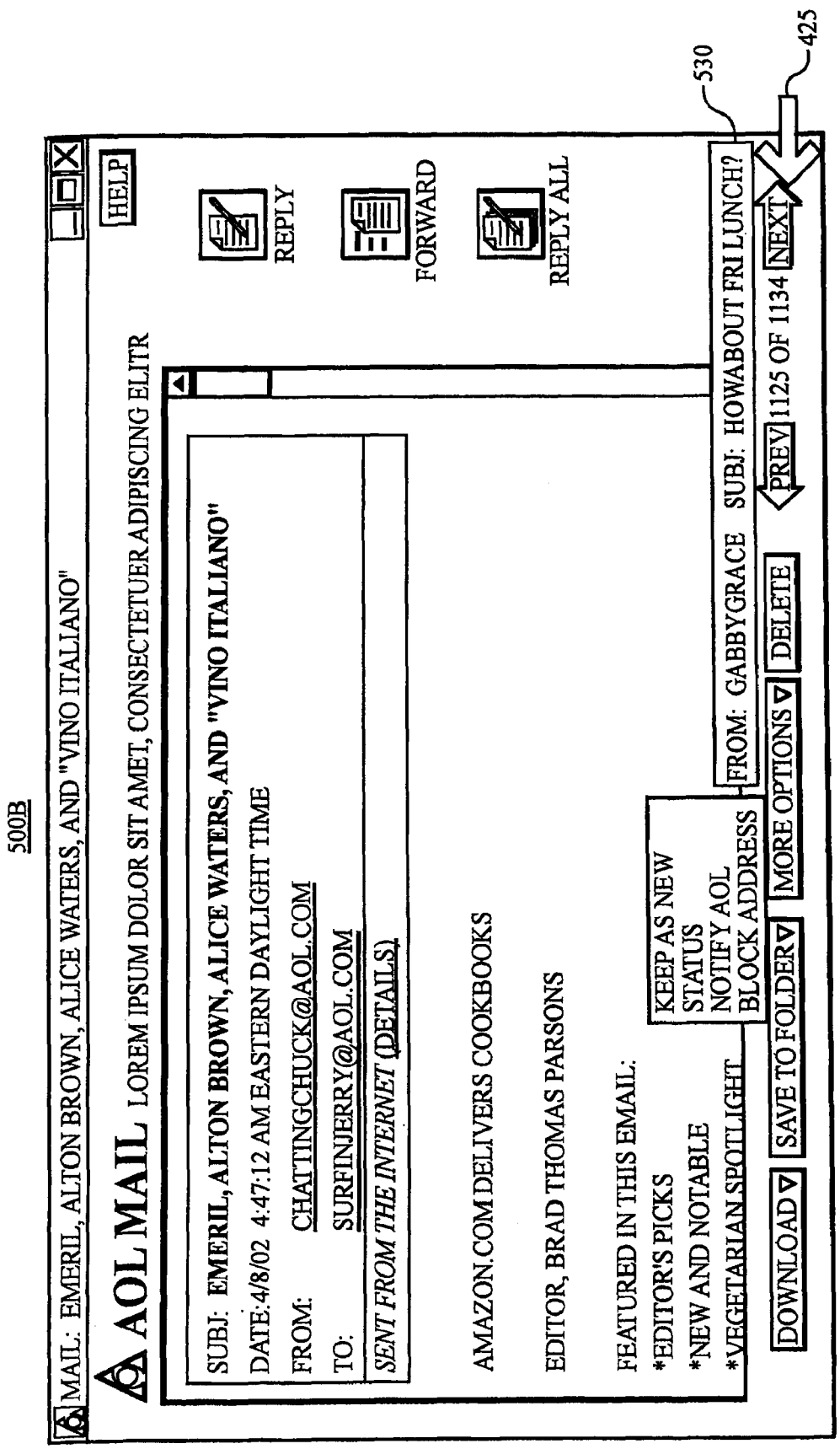

FIG. 5A illustrates one example of an e-mail user interface (UI) 500A displaying a particular received e-mail message 410a. The UI 500A shows information about the selected or default message 410a, including the "From" field 415c, the "To" field 417a, the "Date" field 415b, the "Subject" field 415d, and the message text 417b. UI 500A may include interface controls 505, including interface controls that display the previous 505a and the next 505b e-mail messages.

FIG. 5B illustrates an example of an UI 500B similar to UI 500A described above with respect to FIG. 5A. In the example of FIG. 5B, an informational tool tip 530 may be provided for UI 500B to provide the user with a perceivable indication of at least a portion of an e-mail message that is not otherwise being actively displayed by UI 500A. For example, in response to a mouse rollover of the Next button, the informational tool tip 530 may show all or a portion of the desired e-mail message 410b with e-mail sender "GabbyGrace," without the user needing to take action that would cause the desired e-mail message 410b to replace e-mail message 410a as the selected or default message. In the example of FIG. 5B, the tool tip 530 shows the from field and the subject field of message 410b. The informational tool tip may be rendered in various locations on the display. For example, the tool tip may be rendered proximate or close to the interface control 405b to which the tool tip corresponds, which, in this case, is near the Next button.

FIG. 6A illustrates an example of a user interface (UI) 600A that may be presented to a user of an online service provider such as AOL. The UI 600 includes a toolbar 605 for quickly enabling activation of features such as, for example, reading or writing e-mail, exchanging IM messages with another user, entering chat areas with other users, shopping or accessing the Internet. The toolbar 605 may include one or more general interface actionable items 610, 620, 630, 640, and 650, each of which is configured to enable activation of an associated UI. The actionable item may be, for example, a button or a tab.

FIG. 6B illustrates another example of an e-mail user interface (UI) 600B that may be presented to a user. UI 600B is similar to the examples discussed above with respect to FIG. 6A. In the example of FIG. 6B, an informational tool tip 630 may be provided for the UI 600B to provide the user with perceivable indication that at least a portion of an e-mail message not otherwise actively displayed. For example, as shown in FIG. 6B, the display of all e-mail UIs have been minimized, and a new mail indicator 615 is provided for the user and indicates that a new e-mail message is present. As shown, a user has positioned a pointer 425 proximate to or directly over new mail indicator 615 in order to render the informational tool tip 630. In response, the informational tool tip 630 is activated as described previously with respect to FIGS. 4B and 5B.

FIG. 6C illustrates another example of an e-mail user interface (UI) 600C that may be presented to a user. UI 600C is similar to the examples discussed above with respect to FIGS. 6A and 6B. In the example of FIG. 6C, icons 620, 625, 630 correspond to e-mail messages which have been minimized and are not presently being displayed. In the example of FIG. 6C, a user has positioned a pointer 425 proximate to or over icon 620 in order to render the informational tool tip 630.

Figure 7:
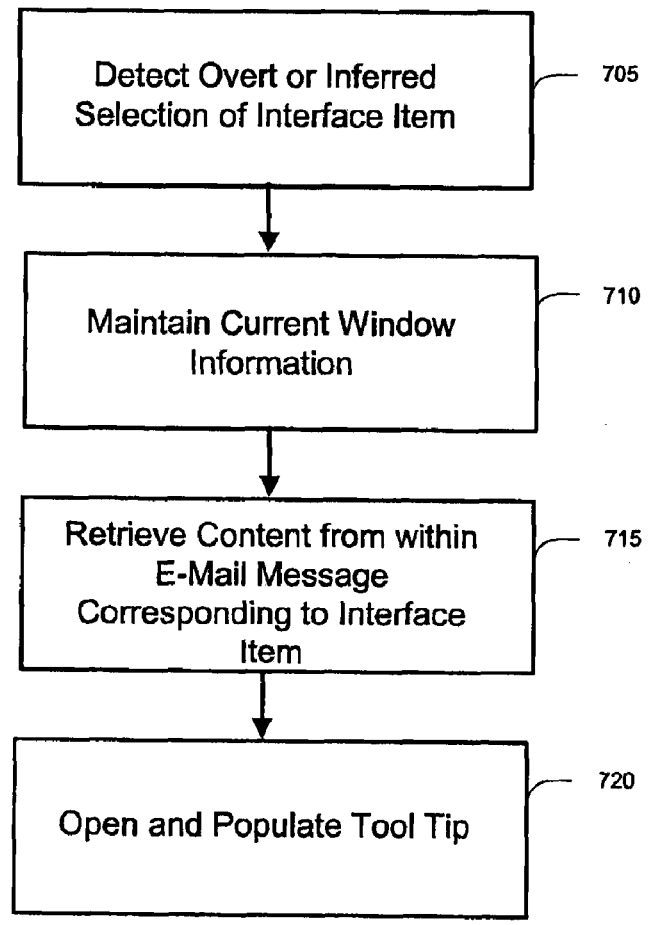

FIG. 7 illustrates an exemplary procedure 700 for opening and populating a tool tip window. The procedure 700 may be implemented by any type of hardware, software, device, computer, computer system, equipment, component, program, application, code, storage medium, or propagated signal.

In procedure 700, the overt or inferred selection of an interface tab or other interface item corresponding to an e-mail is detected (step 705). For example, a selection may be inferred by the positioning of a pointer over or proximate to the interface tab or other interface item. In one implementation, if the position of the pointer is proximate to or positioned over the interface tab, or remains so positioned for a predetermined threshold period of time, a selection of the interface tab or other interface item is inferred. An overt selection of an interface tab or other interface item may also be made. For example, a button or other control on a mouse or other input device may be manipulated to make the overt selection.

The current window information is maintained (step 710). For example, referring to FIG. 5A, display of the selected or default e-mail message 410a is maintained.

Next, content from within the e-mail message corresponding to the interface tab or other interface item is retrieved (step 715). In one implementation, all of the content of the e-mail message is retrieved. In another implementation, only a portion of the content of the e-mail message is retrieved. The tool tip is then opened and populated (step 720) with the retrieved content. For example, the tool tip may be opened and may appear as a rectangular pop-up window proximate to the interface tab over which the mouse is positioned. In other implementations, the tool tip may be opened in other locations on the display. The window may be automatically closed based on a timeout or based on an inferred intent to close the window, rather than an express or overt closing instruction by the user.

The relative placement of steps of described processes with respect to other steps and with respect to each other, such as, for example, steps 305-335 in FIG. 3 and steps 705-720 in FIG. 7, may vary, and one or more steps may be eliminated altogether.

Other implementations are within the scope of the following claims. For example, although the examples above are given in an e-mail context, other communications systems with similar attributes may be used. Also, the UI may be a viewable interface, an audible interface, a tactile interface, or any combination thereof.

What is claimed is:

1. A method of displaying information related to electronic mail messages in an interface, the method comprising:
rendering, in a display portion of an electronic mail user interface configured to display content from electronic mail messages, a display of content from a first electronic mail message included in a group of electronic mail messages received by a user;
rendering, in the electronic mail user interface, a control element configured to, upon selection, trigger display, in the display portion of the electronic mail user interface, of content from a second electronic mail message included in the group of electronic mail messages received by the user, the second electronic mail message being an electronic mail message included in the group of electronic mail messages immediately prior to or immediately subsequent to the first electronic mail message;
while content from the first electronic mail message is displayed in the display portion of the electronic mail user interface, determining that, for a threshold period of time, a position of an input device is maintained relative to the control element; and
in response to determining that, for the threshold period of time, the position of the input device is maintained relative to the control element:
rendering, in an informational tool tip, a display of a portion of content from the second electronic mail message, and
maintaining display of content from the first electronic mail message in the display portion of the electronic mail user interface.

2. The method of claim 1 wherein rendering, in an informational tool tip, a display of a portion of content from the second electronic mail message comprises rendering, in an informational tool tip, a display of a predetermined number of lines included in the second electronic mail message.

3. The method of claim 1 wherein rendering, in an informational tool tip, a display of a portion of content from the second electronic mail message comprises rendering, in an informational tool tip, a display of a predetermined number of characters of content included in the second electronic mail message.

4. The method of claim 1 wherein rendering, in an informational tool tip, a display of a portion of content from the second electronic mail message comprises rendering, in an informational tool tip, a display of multiple predetermined fields of the second electronic mail message, the multiple predetermined fields including at least a from field and a subject field.

5. The method of claim 4 wherein the multiple predetermined fields of the second electronic mail message further include a portion of a message text field, wherein the portion of the message text field includes less than all of the text in the message text field.

6. A method of displaying information related to electronic mail messages in an interface, the method comprising:
rendering a new mail status indicator configured to provide a user with a perceivable indication that a new electronic mail message has been received;
determining that, for a threshold period of time, a position of an input device is maintained relative to the new mail status indicator; and
in response to determining that, for the threshold period of time, the position of the input device is maintained relative to the new mail status indicator, rendering, in an informational tool tip, a display of a portion of content from the new electronic mail message.

7. The method of claim 6 wherein rendering, in an informational tool tip, a display of a portion of content from the new electronic mail message comprises rendering, in an informational tool tip, a display of a predetermined number of lines included in the new electronic mail message.

8. The method of claim 6 wherein rendering, in an informational tool tip, a display of a portion of content from the new electronic mail message comprises rendering, in an informational tool tip, a display of a predetermined number of characters of content included in the new electronic mail message.

9. The method of claim 6 wherein rendering, in an informational tool tip, a display of a portion of content from the new electronic mail message comprises rendering, in an informational tool tip, a display of multiple predetermined fields of the new electronic mail message, the multiple predetermined fields including at least a from field and a subject field.

10. The method of claim 9 wherein the multiple predetermined fields of the new electronic mail message further include a portion of a message text field, wherein the portion of the message text field includes less than all of the text in the message text field.

11. A method of displaying information related to electronic mail messages in an interface, the method comprising:
receiving a first command to display an electronic mail message;
in response to receiving the first command to display the electronic mail message, rendering a display of the electronic mail message;
receiving a second command to minimize the display of the electronic mail message;
in response to receiving the second command to minimize the display of the electronic mail message:
removing the display of the electronic mail message, and causing an icon corresponding to the electronic mail message to be displayed
in an operating system task area;
determining that, for a threshold period of time, a position of an input device is maintained relative to the icon corresponding to the electronic mail message; and
in response to determining that, for the threshold period of time, the position of the input device is maintained relative to the icon corresponding to the electronic mail message, rendering, in an informational tool tip, a display of a portion of content from the electronic mail message.

12. The method of claim 11 wherein rendering, in an informational tool tip, a display of a portion of content from the electronic mail message comprises rendering, in an informational tool tip, a display of a predetermined number of lines included in the electronic mail message.

13. The method of claim 11 wherein rendering, in an informational tool tip, a display of a portion of content from the electronic mail message comprises rendering, in an informational tool tip, a display of a predetermined number of characters of content included in the electronic mail message.

14. The method of claim 11 wherein rendering, in an informational tool tip, a display of a portion of content from the electronic mail message comprises rendering, in an informational tool tip, a display of multiple predetermined fields of the electronic mail message, the multiple predetermined fields including at least a from field and a subject field.

15. The method of claim 14 wherein the multiple predetermined fields of the electronic mail message further include a portion of a message text field, wherein the portion of the message text field includes less than all of the text in the message text field.

16. A method of displaying information related to electronic mail messages in an interface, the method comprising:
rendering, in a display portion of an electronic mail user interface configured to display content from electronic mail messages, a display of content from a first electronic mail message included in a group of electronic mail messages that have been received by a user and organized in a folder;
rendering, in the electronic mail user interface, a display of a list of display items corresponding to electronic mail messages included in the group of electronic mail messages that have been received by the user and organized in the folder, each display item included in the list being configured to, upon selection, trigger display, in the display portion of the electronic mail user interface, of content from an electronic mail message corresponding to the display item;
while content from the first electronic mail message is displayed in the display portion of the electronic mail user interface, determining that, for a threshold period of time, a position of an input device is maintained relative to a particular display item included in the list of display items that correspond to electronic mail messages included in the group of electronic mail messages that have been received by the user and organized in the folder, the particular display item corresponding to a second electronic mail message that is different from the first electronic mail message; and
in response to determining that, for the threshold period of time, the position of the input device is maintained relative to the particular display item included in the list of display items:
rendering, in an informational tool tip, a display of a portion of content from the second electronic mail message that corresponds to the particular display item, and
maintaining display of content from the first electronic mail message in the display portion of the electronic mail user interface.

17. The method of claim 16 wherein rendering, in an informational tool tip, a display of a portion of content from the second electronic mail message comprises rendering, in an informational tool tip, a display of a predetermined number of lines included in the second electronic mail message.

18. The method of claim 16 wherein rendering, in an informational tool tip, a display of a portion of content from the second electronic mail message comprises rendering, in an informational tool tip, a display of a predetermined number of characters of content included in the second electronic mail message.

19. The method of claim 16 wherein rendering, in an informational tool tip, a display of a portion of content from the second electronic mail message comprises rendering, in an informational tool tip, a display of multiple predetermined fields of the second electronic mail message, the multiple predetermined fields including at least a from field and a subject field.

20. The method of claim 19 wherein the multiple predetermined fields of the second electronic mail message further include a portion of a message text field, wherein the portion of the message text field includes less than all of the text in the message text field.

* * * * *